United States Patent
Annunziata et al.

(10) Patent No.: US 11,258,924 B2
(45) Date of Patent: Feb. 22, 2022

(54) IMAGE SET ALIGNMENT

(71) Applicant: ONFIDO LTD, London (GB)

(72) Inventors: Roberto Annunziata, London (GB); Christos Sagonas, London (GB); Jacques Cali, London (GB)

(73) Assignee: ONFIDO LTD, London (GB)

( * ) Notice: Subject to any disclaimer, the term of this patent is extended or adjusted under 35 U.S.C. 154(b) by 252 days.

(21) Appl. No.: 16/597,626

(22) Filed: Oct. 9, 2019

(65) Prior Publication Data
US 2020/0120233 A1 Apr. 16, 2020

(30) Foreign Application Priority Data
Oct. 10, 2018 (EP) ........................................ 8199633

(51) Int. Cl.
| | | |
|---|---|---|
| *G06K 9/20* | (2006.01) | |
| *G06K 9/36* | (2006.01) | |
| *H04N 1/387* | (2006.01) | |
| *G06K 9/46* | (2006.01) | |
| *G06N 3/04* | (2006.01) | |
| *G06N 3/08* | (2006.01) | |
| *G10L 15/16* | (2006.01) | |

(52) U.S. Cl.
CPC ......... *H04N 1/3876* (2013.01); *G06K 9/4628* (2013.01); *G06N 3/0454* (2013.01); *G06N 3/08* (2013.01); *G10L 15/16* (2013.01)

(58) Field of Classification Search
CPC .. H04N 1/3876; G06K 9/4628; G06K 9/3275; G06K 9/00442; G06N 3/0454; G06N 3/08; G10L 15/16
USPC .......................................................... 382/284
See application file for complete search history.

(56) References Cited

U.S. PATENT DOCUMENTS

2009/0284802 A1* 11/2009 Yeap .................... G06K 9/2054
358/3.28
2017/0193628 A1* 7/2017 Sharma ................. G06T 3/0056
(Continued)

FOREIGN PATENT DOCUMENTS

EP 3511868 A1 7/2019

OTHER PUBLICATIONS

Annunziata, et al., "DeSTNet: Densely Fused Spatial Transformer Networks", 29th British Machine Vision Conference, Available online at: URL:https://arxiv.org/pdf/1807.04050.pdf, Sep. 3, 2018, 12 pages.
(Continued)

*Primary Examiner* — Charlotte M Baker
(74) *Attorney, Agent, or Firm* — Kilpatrick Townsend & Stockton LLP

(57) ABSTRACT

A computer-implemented method for aligning a set of images which have shared structural characteristics, such as images of an official document. The method comprises acquiring image data comprising a set of images and applying, using a first deep neural network, at least one image transform to the image data to form aligned image data in which each image of the set of images is substantially aligned with a template image. Then, the aligned image data is compressed and the image data reconstructed from the compressed image data, and a set of aligned images is output from the reconstructed image data. The set of aligned images may be annotated for automated official document authentication.

20 Claims, 8 Drawing Sheets

(56) References Cited

U.S. PATENT DOCUMENTS

2019/0213408 A1     7/2019   Cali et al.
2020/0014955 A1*   1/2020   Grangetto ............ H04N 19/136

OTHER PUBLICATIONS

EP18199633.1, "Extended European Search Report", dated Apr. 3, 2019, 9 pages.
Jaderberg, et al., "Spatial Transformer Networks", Proceedings of Advances in Neural Information Processing Systems, Jun. 5, 2015, pp. 2017-2025.
Peng, et al., "RASL: Robust Alignment by Sparse and Low-rank Decomposition for Linearly Correlated Images", IEEE Computer Society Conference on Computer Vision and Pattern Recognition, vol. 34, No. 11, Nov. 2012, pp. 2233-2246.
Wu, et al., "Recursive Spatial Transformer (Rest) for Alignment-free Face Recognition", IEEE International Conference on Computer Vision (ICCV), Oct. 22-29, 2017, pp. 3792-3800.
181996331.1, "European Examination Report", dated Sep. 29, 2021, 5 pages.
Yoo, et al., "ssEMnet: Serial-Section Electron Microscopy Image Registration Using a Spatial Transformer Network with Learned Features", Ulsan National Institute of Science and Technology, The Rockefeller University, Harvard Medical School, XP055844096, arXiv:1707.07833v2 [cs.CV], Dec. 5, 2017, 8 pages.

\* cited by examiner

IMAGE SET ALIGNMENT

CROSS-REFERENCES TO RELATED APPLICATIONS

This application claims priority to European Patent Application Number 18199633.1, filed Oct. 10, 2018.

FIELD OF THE DISCLOSURE

The present disclosure relates to a method for aligning a set of images. More specifically, it relates to a computer-implemented method for aligning a set of images with shared structural characteristics, such as images of official documents.

BACKGROUND OF THE INVENTION

Official documents are often used to check and test the identity of people. This is typically done manually. For example, a representative of a car rental company may check a customer's driving license before authorizing the rental of a car to the customer. Such checking implicitly requires manual verification of the presented documents to check their authenticity.

One problem that is encountered is that people may use forged or counterfeit documents to present false details. In the case of manual verification, the authenticity of a document is assessed using an assessor's experience and many factors are taken into account. Often, an assessor will suspect a presented document is not authentic, but will not be able to identify on what factor they base their assessment. An assessor's ability to assess documents will also be limited by their experience with particular types of documents.

Manual verification is therefore a highly skilled and labour intensive process that may lead to uncertainty and processing bottlenecks. For this reason, various systems have been developed to assist and automate aspects of identity verification, in particular for official document authentication. One such system uses a scanner to identify and read machine-readable zones (MRZ) on a document and check that the information contained in the MRZ is authentic. Another such system includes a device to image the document and perform optical character recognition (OCR) on the image in order to extract textual information from the document, and similarly check whether the extracted information is authentic. Further systems include extracting a facial photograph from a document and comparing the extracted facial photograph with a photograph of the user via face matching.

Such systems have meant that there is no longer a need for a person having their identity checked to physically present their document to an assessor for authentication. Instead, the person may capture an image of their document using a user electronic device, such as a mobile electronic device, and send the image on for automated official document authentication. This has proved popular for those having their identity checked due to its convenience, and for those which require identity verification, such as the car rental company mentioned above, due to the increased speed of verification.

However, one drawback of capturing an image of an official document in such a way is that the image of the official document may not be aligned within the captured image. For example, image of the official document may appear rotated within the captured image. This rotation may not only be perpendicular to the image plane, but may be a three-dimensional rotation such that one or more edges of the document may appear larger in the captured image than opposing edges. This misalignment is problematic because the information contained in the image of the official document does not have the appearance that it would have done if the image would have been aligned, making it difficult to perform automated official document authentication for the official document. Accordingly, it is usually necessary to align the image of an official document before performing automated official document authentication.

The present invention therefore relates to a method for aligning a set of images which have shared structural characteristics, such as official documents.

BRIEF SUMMARY OF THE INVENTION

The present invention is defined by the independent claims, with further optional features being defined by the dependent claims.

There is provided a computer-implemented method for aligning a set of images, the method comprising: acquiring image data comprising a set of images; applying, using a first deep neural network, at least one image transform to the image data to form aligned image data in which each image of the set of images is substantially aligned with a template image; compressing the aligned image data; reconstructing the image data from the compressed image data; and outputting a set of aligned images from the reconstructed image data. The computer-implemented method is preferably unsupervised. The image data is preferably large-scale image data (e.g. may contain up to 2000 images, each image at a resolution of up to 256×256 pixels).

Each image of the set of images may be substantially aligned with a template image in that there may be an alignment error. The computer-implemented method for aligning a set of images may comprise calculating the alignment error using the aligned image data and the template image, and training the first deep neural network using the calculated alignment error. To calculate the alignment error, the aligned image data may be normalized to have zero mean and unit standard deviation, and the alignment error calculated using the L1-norm using the normalized aligned image data. Optionally, the alignment error may be calculated using each of the pixels of the normalized aligned image data and each of the pixels of the template image.

To train the first deep neural network using the calculated alignment error, the calculated alignment error may be back-propagated to the first deep neural network. Additionally or alternatively, training the first deep neural network using the calculated alignment error may comprise updating the weight parameters of the first deep neural network using the calculated alignment error.

Optionally, a reconstruction error may be calculated using the aligned image data and the reconstructed image data. The reconstruction error may be calculated using the L1-norm, and/or may be calculated using the L2-norm.

The first deep neural network may be trained using the calculated reconstruction error in addition to, or as an alternative to training using the calculated alignment error. To train the first deep neural network using the calculated reconstruction error, the calculated reconstruction error may be back-propagated to the first deep neural network. Additionally or alternatively, training the first deep neural network using the calculated reconstruction error may further comprise updating the weight parameters of the first deep neural network using the calculated reconstruction error.

The aligned image data may be compressed and the image data reconstructed using a second deep neural network (different from the first deep neural network). The second deep neural network may be trained using the calculated reconstruction error. To train the second deep neural network using the calculated reconstruction error, the calculated reconstruction error may be back-propagated to the second deep neural network.

Optionally, prior to outputting the set of aligned images, the steps of applying, using a first deep neural network, at least one image transform to the image data to form aligned image data in which each image of the set of images is substantially aligned with a template image, compressing the aligned image data, and reconstructing the image data from the compressed image data may be iterated to improve the alignment of the set of images. Outputting the set of aligned images from the reconstructed image data may comprise using the reconstructed image data of the iterated steps.

The set of images have shared structural characteristics. For example, each image of the set of images may comprise an image of an official document. The official document may be the same type of official document for each image of the set of images. Similarly, the template image may comprise an image of an official document. In such examples, the official document of the template image is preferably the same type of official document as each image of the set of images. The set of images may comprise between 2 and 2000 images. Additionally or alternatively, images in the set of images may have a working resolution of up to 256×256 pixels.

The at least one image transform applied using the first deep neural network may be a linear transformation. For example, the at least one image transform may comprise one or more of: rotation, translation, scaling, and shearing. Preferably, the first deep neural network is based on a densely fused spatial transformer network (DeSTNet).

The second deep neural network may be an autoencoder. The autoencoder may comprise an encoder module and a decoder module, wherein the aligned image data is compressed using the encoder module and the image data is reconstructed using the decoder module. In particular, the aligned image data may be compressed into a latent-space representation, and the image data may be reconstructed from the latent-space representation. Preferably, the encoder module and the decoder module are fully-connected.

The reconstructed image data may have a reduced data size compared to the aligned image data. To this end, a low-rank penalty may be applied to the output of the encoder module (i.e. to the latent-space representation). The low-rank penalty may be approximated by, for example, a monotonically increasing functional penalty.

There is also provided a computer-implemented method for annotating a set of aligned images obtained by the above-describe method for aligning a set of images. The method for annotating the set of aligned images comprises: annotating a portion of the template image, the annotated portion having first coordinates; acquiring the aligned set of images; obtaining a corresponding portion in each of the set of images using the first coordinates. The portion may comprise one or more of: a text field, an image field, a machine readable zone.

There is also provided a computer-readable medium comprising executable instructions for performing the above-described computer-implemented methods.

There is further provided a computer comprising a processor configured to execute executable code stored in memory, wherein the executable code comprises instructions for performing the above-described computer-implemented methods.

BRIEF DESCRIPTION OF THE DRAWINGS

The present disclosure is made by way of example and with reference to the accompanying drawings in which.

DETAILED DESCRIPTION OF THE INVENTION

Figure 1:
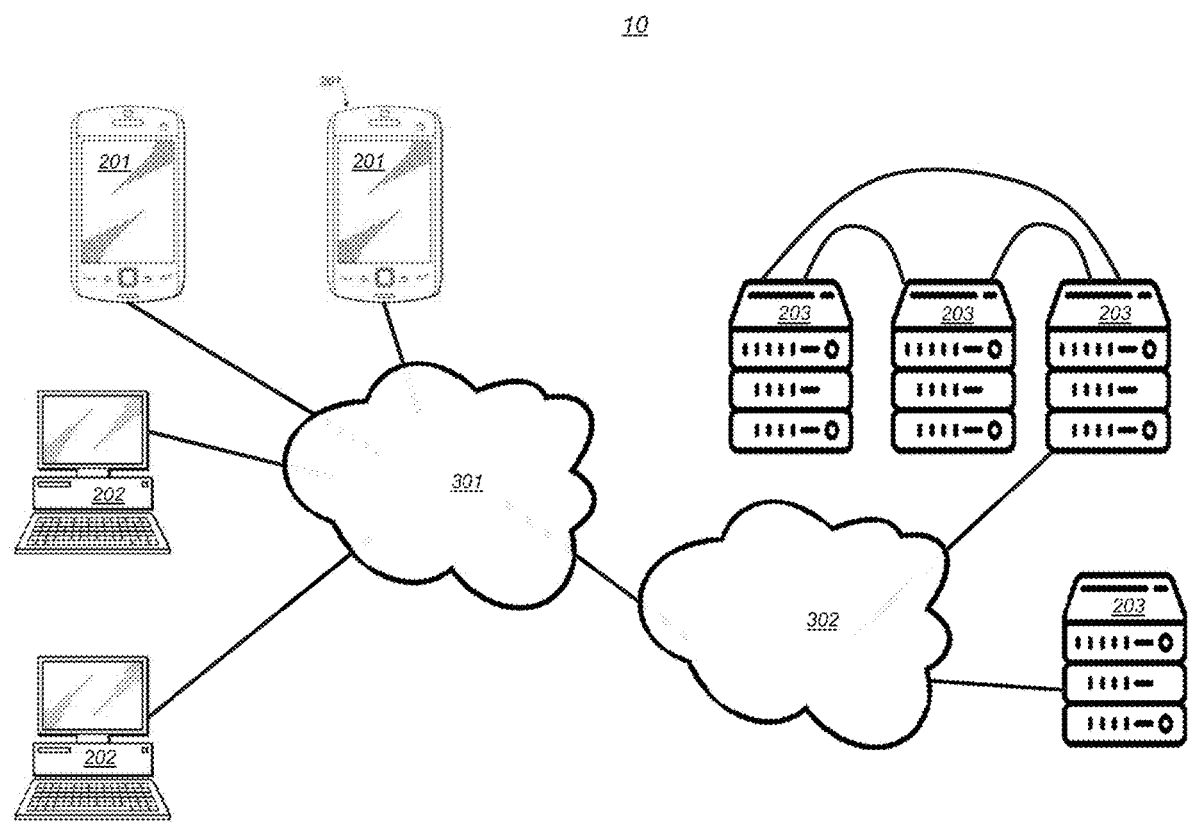
FIG. 1 is a component diagram of a system that may be used to implement the present invention.

FIG. 1 shows a system 10 in which, according to one embodiment, the disclosed method is implemented. The system comprises user electronic devices 201, 202, including mobile electronic device 201, fixed location electronic device 202, and server 203. The user electronic devices are in communication with at least one communication network 302 (which may, but not necessarily, include wireless network 301). Data may be communicated between the user electronic devices 201, 202. The at least one communication network 302 may include the internet, an internet of things (IoT) network, a cellular network, or the like. The wireless network 301 may, for example, be a 4G LTE network or WiFi communication network, or any other conventionally known wireless communication network. The described network architecture is only exemplary and modifications to it, including removing or adding of network components, are possible.

Figure 2:
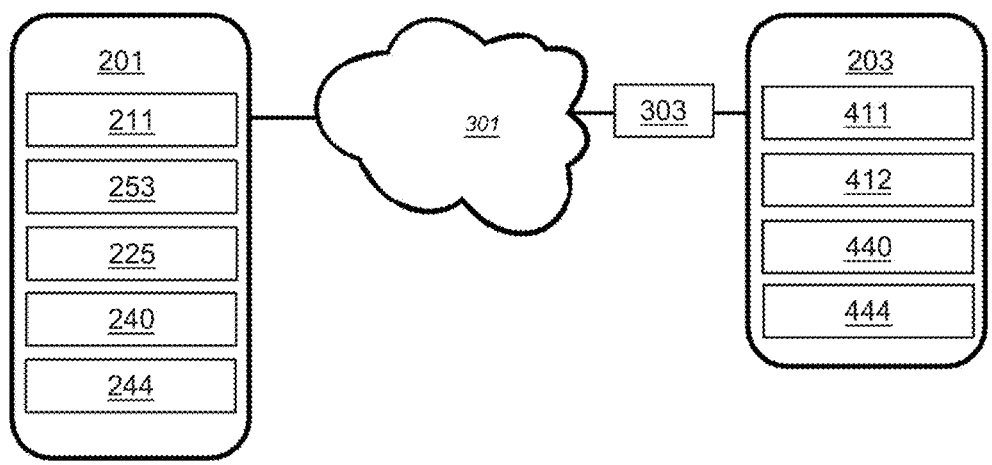
FIG. 2 is a diagram showing components of the system of FIG. 1.

FIG. 2 shows selected aspects of the network system 10 shown in FIG. 1. Specifically, FIG. 2 shows a mobile electronic device 201 in communication, over the wireless network 301, with a server 203. The server 203 is an electronic device that can be accessed across the network 302 by user electronic devices 201, 202 to perform computational tasks. The mobile electronic device 201 comprises a communication subsystem 211 to enable communication across the wireless network 301. The mobile electronic device 201 further comprises at least one application 225 that can be executed on a processor 240 and a camera 253 that can be used to acquire image data. The image data and applications 225 are stored in memory 244 on the mobile electronic device 201.

FIG. 2 also shows a server 203 which is connected to the wireless network 301 by a wireless network interface 303 and a network interface 411. The server 203 further comprises applications 412 that can be executed on a processor 440. The server further comprises memory 444 on which the applications 412 and any data that is received from the wireless network 301, and any user electronic device 201, 202 connected thereto, can be stored. The server 203 may be distributed and comprise multiple servers, several processors and/or several memory storage locations. Such a distributed server 203 may operate by distributing computational tasks and data across its constituent parts and may communicate with other servers to perform computational operations.

Figure 3:
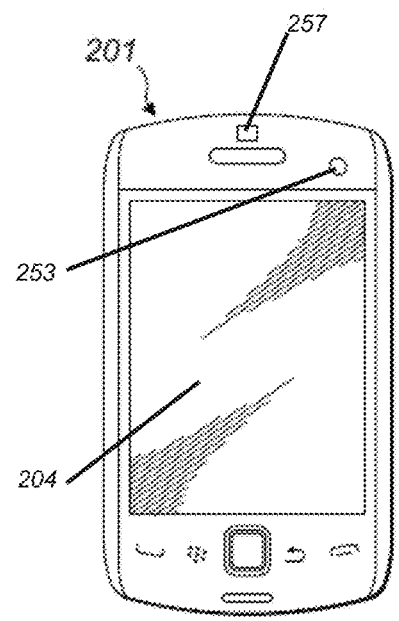
FIG. 3 is a front view of a user electronic device that may be used to capture image data.

FIG. 3 provide further details of mobile electronic device 201. The mobile electronic device 201 comprises a display 204, the camera 253, and an electromagnetic (EM) radiation source 257 for illuminating the area to be imaged with the camera 253. The mobile electronic device 201 is an example of a user electronic device 201, 202 by which a camera 253 may be used to capture images. Due to differences between cameras 253 of known user electronic devices 201, 202, the resolution of any images captured may vary, depending on the user electronic device 201, 202 used to capture the image. Captured images from currently known user electronic devices 201, 202 are typically found to have a resolution of between 422×215 pixels and 6016×3910 pixels. These captured images may be communicated over the wireless network 301 to the server 203 and stored in the server memory 444. Other components of the mobile electronic device 201 may include an input device, such as a touch screen or a keyboard, a microphone, and an orientation system, such as a gyroscope or GPS positioning system.

The memory 244 of mobile electronic device 201 includes an operating system 223 which stores the computer-readable code for operating the mobile electronic device 201. As mentioned, the memory 244 also includes applications 225, such as identity authentication application 225, which are downloadable to memory 244 from server 203 via the at least one communication network 302, or are pre-stored on the memory 244. Other data 227 may also be present in memory 244 such as current and historical metadata of the mobile electronic device 201.

The fixed location device 202 may have similar components to the mobile electronic device 201. The components may be integrated into the fixed location device 202, or may be in communication with the fixed location device via a port in the fixed location device 202. For example, camera 253 may be connected to the fixed location device 202 via a USB port or similar in the fixed location device 202.

In the server 203, application software of the stored applications 412 executes on the processor 440 to perform one or more of the methods disclosed herein. In other words, the stored applications 412 include executable code which are stored in server memory 444, where the executable code comprises instructions for performing one or more of the methods disclosed herein. Any such method may use captured images previously acquired from user electronic device 201, 202, which has been stored in the server memory 444.

It will be understood that the system 10 described above is merely an exemplary system 10 for implementing the disclosed method defined herein.

Figure 4:
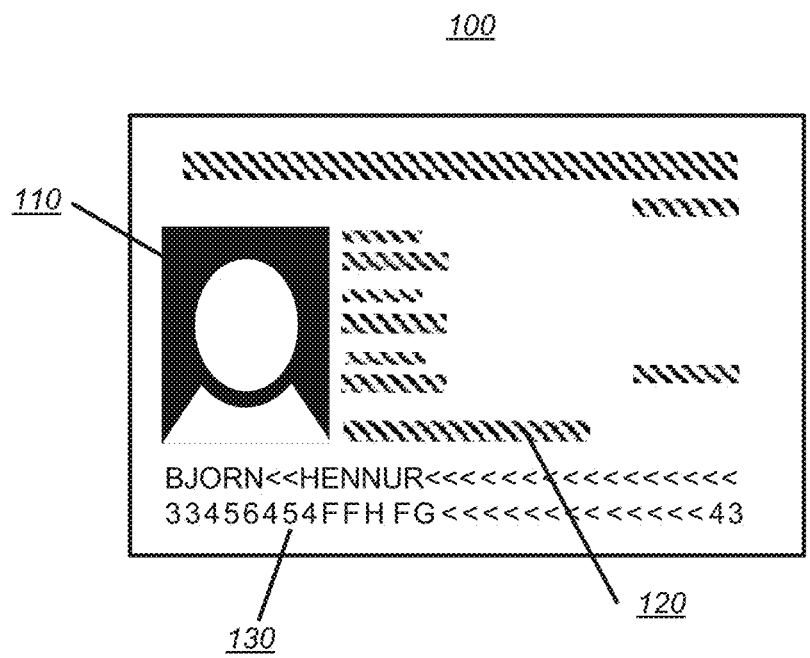
FIG. 4 presents a block image of an exemplary official document.

The images acquired by user electronic devices 201, 202 may have shared structural characteristics, such as images of an official document 100, as shown in FIG. 4. An official document 100 may take one of many forms such as a driving license, a passport, a utility or other bill, a birth certificate, a benefits book, a state identity card, or a residency permit. The term "official document" is therefore intended to cover any document that contains structured information that may be used to verify a person's identity or an aspect relating a person, for example their address. The different forms of official document 100 may be referred to herein as being a particular "type" of official document 100, which may be further restricted by the territory of issue. For example, an official document type might be a 'UK passport', a 'Finnish driving licence', etc.

Images of official document 100 have shared structural characteristics in that the official document 100 includes one or more features which are common to that type of official document 100. Referring to FIG. 4, there is an exemplary official document 100 which comprises the features of a facial photograph 110, one or more lines of text 120, and a machine-readable zone (MRZ) 130. The at least one feature may be positioned in set locations for the type of official document 100. The at least one feature may also have set size and format. For example, in an exemplary official document 100, there may be positioned at 5 mm in from the left edge and 20 mm down from the top edge a facial photograph in a particular size and format. For example, the facial photograph may be 40 mm high and 20 mm wide. To reduce the likelihood of counterfeiting, the structure and format of the official document 100, and its constituent features, may be restricted or difficult to obtain and therefore reproduce. The skilled person is aware that particular types of official document 100 have particular structures and formats.

Overview of the Method

As mentioned above, a known drawback of capturing an image of an official document 100 via a user electronic device 201, 202 is that the image of the official document 100 may not be aligned within the captured image. For example, the image of the official document 100 may appear rotated within the captured image. This rotation may not only be perpendicular to the image plane, but may be a three-dimensional rotation such that one or more edges of the official document 100 may appear larger in the captured image than opposing edges. This misalignment is problematic because the information contained in the official document 100 does not have the appearance that it would have done has the image of official document 100 been aligned, making it difficult to perform automated official document authentication on the official document 100. Accordingly, it is usually necessary to align the image of the official document 100 before performing automated official document authentication.

In certain circumstances, it may be necessary to align more than one image of an official document 100, referred to herein as a set of images. For example, there may be a dedicated server, such as server 203, which processes the alignment of images via its processor 440 using stored applications 412 in server memory 444. In such circumstances, it is possible to queue the set of images in server memory 444, and then align each image one-by-one using processor 440. However, such a method is computationally intensive and may take a significant length of time if the number of images is large. Accordingly, jointly aligning the set of images is preferred. Such joint alignment is commonly referred to as image congealing.

Previously proposed approaches for jointly aligning a set of images having shared structural characteristics, such as the matrix rank minimization method adopted in Peng, Y., Ganesh, A., Wright, J., Xu, W. and Ma, Y., 2012, "RASL: Robust alignment by sparse and low-rank decomposition for linearly correlated images", IEEE transactions on pattern analysis and machine intelligence, 34(11), pp. 2233-2246, have unsatisfactory alignment results for images captured by a user electronic device 201, 202 due to the extent of misalignment in the set of images.

Moreover, due to the way in which the joint alignment is computed in these previously proposed approaches, these approaches are limited in the amount of images that can be jointly aligned, and also in the resolution of the images that can be jointly aligned. Thus, such approaches cannot adequately align images captured with high resolution, as is the case for images captured by certain user electronic devices 201, 202, or images which have been acquired from different user electronic devices 201, 202 having different resolutions.

There are further challenges for images captured by user electronic devices 201, 202 which make these images difficult to jointly align, such as non-uniform illumination, shadows, and compression noise. Moreover, there may be present in the captured image a highly variable background which may include clutter and non-target objects. Further, there may be occlusion in the image of the official document 100, for example the presence of fingers covering part of the official document 100 when held for image capture. Thus, there is a need for a method of aligning a set of images which addresses one or more of these issues.

Figure 5:
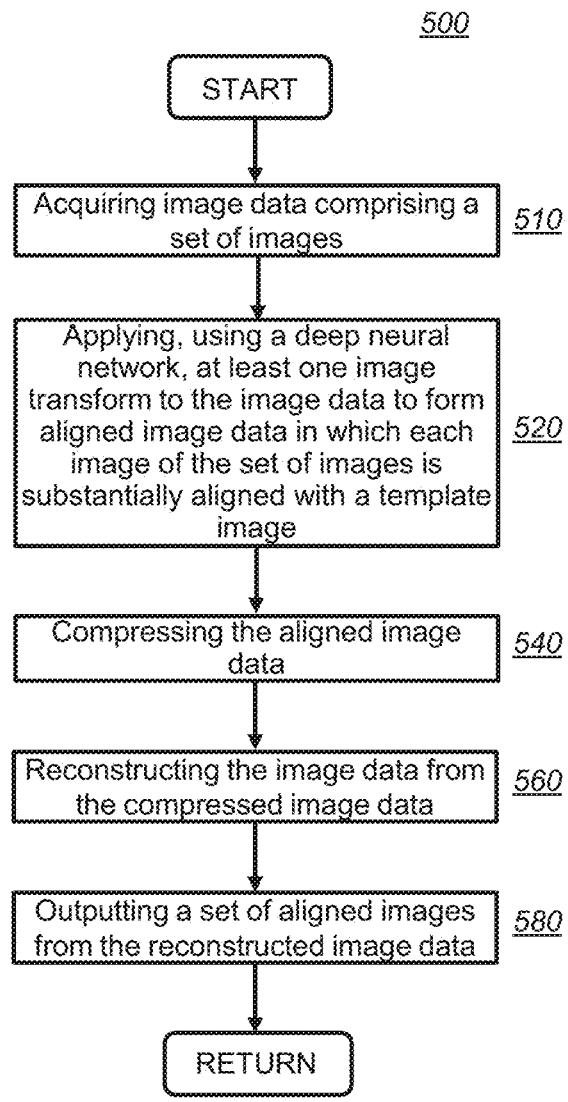
FIG. 5 presents a flow diagram according to the present invention.

Referring to FIG. 5, an overview of the disclosed method for aligning a set of images is provided. The method is preferably performed by processor 440 using the stored applications 412 in server memory 444.

The method 500 comprises the steps of: acquiring image data comprising a set of images (step 510); applying, using a first deep neural network, at least one image transform to the image data to form aligned image data in which each image of the set of images is substantially aligned with a template image (step 520); compressing the aligned image data (step 540); reconstructing the image data from the compressed image data (step 560); and outputting a set of aligned images from the reconstructed image data (step 580).

As noted from the steps above, the method is not restricted to a set of images which contain an image of an official document 100, but may also be used for any set of images having shared structural characteristics. Other image which have shared structural characteristics include, for example, images of a particular font, images of a particular person, and images of a particular product, amongst others.

The steps introduced above are described below in detail with respect images of an official document 100. However, the skilled person would appreciate that the steps are applicable to any images having shared structural characteristics.

Acquiring Image Data

Figure 6:
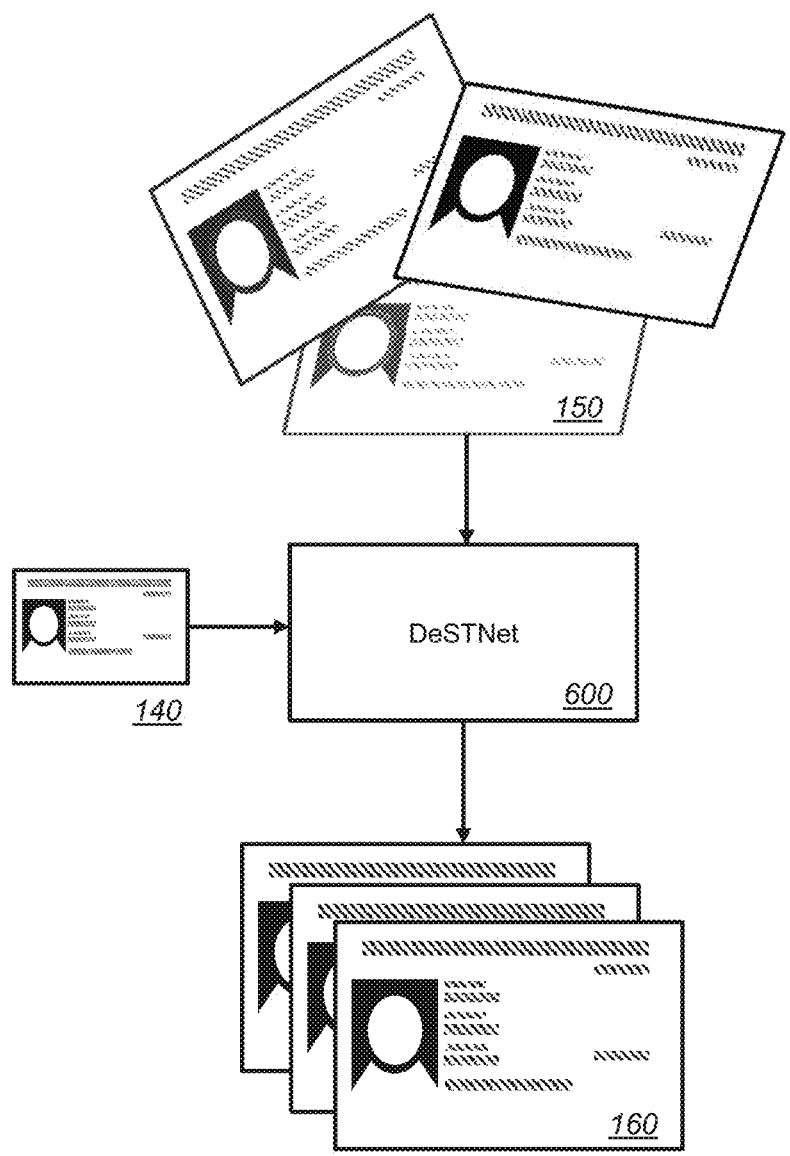
FIG. 6 presents an exemplary first deep neural network for use with the present invention.

With reference to step 510 of FIG. 5, the first step of the method is to acquire image data 150 comprising a set of images. Example image data 150 is depicted in FIG. 6.

The set of images, as used herein, refers to images of an official document 100. In other words, each image of the set of images comprises an image of an official document 100. The set of images, as used herein, is not intended to refer to the images captured by user electronic devices 201, 202 since an aim of the disclosed methods is to jointly align a set of images of an official document 100 within captured images, rather than aligning the captured images themselves. However, it will be appreciated that an image of an official document 100 may be present in a captured image.

Preferably, the set of images have shared structural characteristics. For example, the image of official document 100 may be the same type of official document 100 for each image of the set of images. For instance, the set of images may comprise five images corresponding to images of UK driving licenses of five different people.

At a minimum, the set of images comprises at least two images. The upper limit for the number of images in the set of images depends on the available computational power of server processor 440. It is recommended based on currently commercially available server processors 400 that the set of images should include no more than about 2000 images. This upper limit is significantly higher than previously proposed approaches for jointly aligning a set of images which can typically only process a maximum of 100 images at once.

The set of images may comprise images having a higher resolution than has been demonstrated in previously proposed approaches for jointly aligning a set of images. In particular, the set of images may comprise images having a resolution of up to and including 256×256 pixels for a large set of images (i.e. up to 2000 images). Conversely, previously proposed approaches for jointly aligning a set of images have been demonstrated resolutions of 28×28 pixels for a large set of images, up to 60×80 pixels for a few tens of images (e.g. 100 images) and 100×100 pixels for a small set of images (e.g. 10-20 images). This higher resolution results in a more efficient optimization of joint alignment of the set of images.

The resolution for each image of the set of images is determined by resizing the image captured by user electronic device 201, 202, which are typically in the range of 422×215 pixels to 6016×3910 pixels, to a lower resolution. This lower resolution is the resolution of up to and including 256×256 pixels mentioned above. Accordingly, the disclosed method is capable of jointly aligning images which are originally captured with a range of resolutions, as is generally the case for images captured by different user electronic devices 201, 202.

Preferably the image data 150 is acquired from server memory 444, where the image data 150 is stored. This allows each of the set of images of the image data 150 to be individually received at the server memory 444 at various times, and for the set of images to therefore subsequently be batch processed by the server processor 440. To this end, server memory 444 may include permanent data storage, such as an optical hard drive, a solid state hard drive, a removable optical disk, etc. Alternatively or additionally, server memory 444 may include non-permanent data storage, such as a cache or random access memory (RAM).

Prior to storing in the server memory 444, each of the set of images may have been captured via a camera 253 of a user electronic device 201, 202. For example, a captured image may be acquired at the server memory 444 via an identification authentication application 225 (or webpage) accessed via user electronic device 201, 202. When the application 225 is first accessed it loads and executes the applications on to the user electronic device 201, 202. The identification authentication application 225 may then prompt the user, via display 204 or a speaker, to use the camera 253 to capture an image of an official document 100, possibly using a separate camera application. This image is then communicated to server memory 444 via any of the previously described communication networks 301, 302. In another example, each of the set of images may not be communicated immediately to the server memory 444 after being captured, but may instead be stored in memory 244 of the user electronic device 201, 202. In such case, the identification authentication application 225 may allow the user to upload an image stored in memory 244 on the user electronic device 201, 202 to the server memory 444.

Image Transform

With reference to step 520 of FIG. 5, the second step of the method is to apply, using a first deep neural network 600, at least one image transform to the image data 150 to form aligned image data 160 in which each image of the set of images is substantially aligned with a template image 140. A particular example of the second step is depicted in FIG. 6.

The first deep neural network attempts to align each image of the set of images of official document 100 with template image 140 such that each image and the template image 140 are at least prima facie aligned (i.e. appears to be aligned at a glance). However, as the skilled person would appreciate, it is difficult, if not impossible, to achieve full alignment (i.e. pixel-by-pixel alignment) in this way, especially when each image is misaligned in three-dimensions, as is the case for images captured by user electronic device 201, 202. Hence, where it is mentioned herein that each image is substantially aligned with template image 140, it is intended to refer to a degree of alignment between "full alignment" and "prima facie" alignment. This degree of alignment (or, more accurately, misalignment) is characterized by an alignment error, as is discussed below.

As depicted in FIG. 6, the template image 140 is an image of an official document 100. In particular, the official document 100 of the template image 140 is the same type of official document 100 as each image of the set of images. For example, when the set of images comprises five images corresponding to images of UK driving licenses of five different people, the template image 140 is an image of a UK driving license. To improve the alignment result of the first deep neural network 600, the template image 140 is preferably a high resolution image which is fully aligned. The template image 140 may be retrieved from server memory 440. Accordingly, the server memory 440 may contain a repository which includes at least one template image of various types of official document 100. The template image 140 may be obtained by the server 203 by, for example, a high-resolution image scanner.

As mentioned above, the first deep neural network 600 applies at least one image transform to the image data 150 to form aligned image data 160. The at least one image transform may be a linear transformation. For example, the at least one image transform may be one or more of: rotation, translation, scaling, and shearing. In rotation, an image is rotated about a particular angle from its origin. In translation, an image is moved laterally from its origin. In scaling, an image is increased or decreased in size. In shearing, also referred to as skewing, the image is slanted in a particular direction.

The first deep neural network 600 applies at least one image transform to the image data 150 so that each image of the set of images is substantially aligned with the template image 140. Thus, the first deep neural network 600 may apply at least one image transform to each image of the set of images. The least one image transform applied to each image may be different from the at least one image transform applied to other images due to the difference in alignment of the image of official document 100 in the images captured by user electronic devices 201, 202.

Deep neural networks such as first deep neural network 600 are known for being able to solve a range of computer vision tasks, such as image alignment. However, the performance of first deep neural network 600 may degrade when the image data 150 includes large variations in alignment in the images, such as is the case for images captured by user electronic devices 201, 202. Spatial transformer networks, such as that described in Jaderberg, M., Simonyan, K., Zisserman, A., et al., 2015, "Spatial transformer networks", In Proceedings of Advances in Neural Information Processing Systems, pp. 2017-2025, may be used to provide first deep neural network 600 with the ability to remove the misalignment and thus improve performance in alignment. Spatial transformer networks may also be sequentially connected to further improve alignment performance, see for example Wu, W., et al, 2017 "Recursive spatial transformer (rest) for alignment-free face recognition", in Proceedings of IEEE International Conference on Computer Vision, pp. 3772-3780.

First deep neural network 600 may have any number 1 of layers, including 1-1 hidden layers, and 1 output layer. The parameters of each layer 1 includes a weight parameter and a bias parameter. The weight parameter is said to indicate the influence of a change in the input of the layer to the output of the layer. For instance, for layers with weights parameters of zero, changing the input of the layer will not change the output of the layer. The weight parameters of first deep neural network 600 may be updated by the disclosed methods, as discussed below. The bias parameter is said to indicate the strength of the assumptions that should be made about the template image 140.

As shown in FIG. 6, the first deep neural network 600 may be based on a densely fused spatial transformer network (DeSTNet). As described in Annunziata, R., Sagonas, C., Cali, J., 2018. "DeSTNET: Densely Fused Spatial Transformer Networks," 29th British Machine Vision Conference, p. 135, DeSTNet includes multiple spatial transformer networks which are connected in a dense fusion pattern. This type of connection of spatial transformer networks causes improved image alignment over sequential connection described above.

It has been shown that DeSTNet can be trained in a supervised manner to detect the corners of an official document 100 in an image of an official document 100. The disclosed method defines further ways to train DeSTNet (and other types of first deep neural network 600) but in an unsupervised manner, as is discussed further herein. Unsupervised learning is preferable to supervised learning because, unlike supervised learning, unsupervised learning does not require large numbers of images to be pre-aligned for training purposes. This means that the first deep neural network 600 can be trained quickly for new types of official document 100, and requires only one image of that type of official document 100, as is discussed further herein.

An advantage of using first deep neural network 600 to align images is that first deep neural network 600 is robust to occlusion which is typically seen in images captured by user electronic device 201, 202, such as a finger holding official document 100. Similarly, first deep neural network 600 is robust to partial crop of the image of official document 100, for example where the captured image does not contain the whole of the official document 100, but rather a corner or edge of the official document is cropped. Previously proposed approaches for aligning images typically fail when the image contains either occlusion or partial crop.

Once the first deep neural network 600 has formed aligned image data 160, it may be desirable to remove from the aligned image data 160 any image data which is not an image of official document 100. For example, if the image data 150 contains, in addition to the set of images, image data representing a background behind official document 100, as would be the case from an image captured by user electronic device 201, 202, then this background image data may be removed by any known method.

Image Compression and Reconstruction

Figure 7:
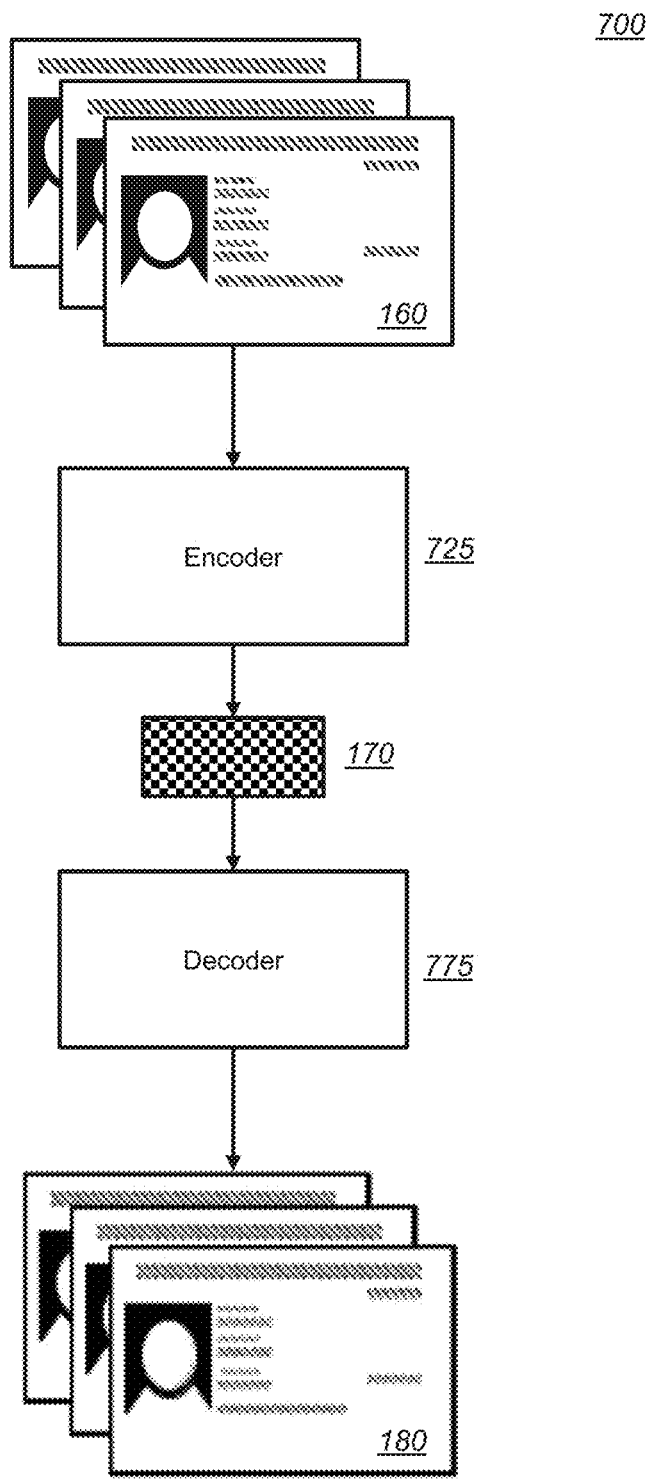
FIG. 7 presents an exemplary second deep neural network for use with the present invention.

With reference to steps 540 and 560 of FIG. 5, the third and fourth steps of the disclosed method are to compress the aligned image data 160, and to reconstruct image data 180 from compressed image data 170. A particular example of the third and fourth steps is depicted in FIG. 7.

It has been previously observed that a set of images sharing similar appearance and structure characteristics which are accurately aligned require less modelling capacity to be reconstructed well than a set of images which are not accurately aligned, see for example Peng Y., Ganesh, A., Wright, J., Xu, W. and Ma, Y., 2012, "RASL: Robust alignment by sparse and low-rank decomposition for linearly correlated images", IEEE transactions on pattern analysis and machine intelligence, 34(11), pp. 2233-2246. Motivated by this observation, the aligned image data 160 is compressed and then reconstructed to form reconstructed image data 180 to further improve the image alignment, where the reconstructed image data 180 has a reduced data size compared to the aligned image data 160. For example, the aligned image data 160 may have a resolution of 256×256 pixels, and the reconstructed image data 180 may have a resolution of 64×64 pixels.

The aligned image data 160 may be compressed and reconstructed using a second deep neural network 700 (different from first deep neural network 600). With reference to the example in FIG. 7, the second deep neural network 700 may be an autoencoder. Autoencoders comprise an encoder module 725 and a decoder module 775. The aligned image data 160 is compressed using the encoder module 725 of the autoencoder and the reconstructed image data 180 is formed from the compressed image data 170 using the decoder module 775 of the autoencoder.

The encoder module 725 and the decoder module 775 are fully-connected, rather than being convolutional. Advantageously, a fully-connected encoder module 725 and decoder module 775 enforces pixel level alignment which would not be enforced with convolutional layers due to translation equivariance.

The compressed image data 170 is a latent-space representation of the aligned image data 160, which means that compressed image data 170 is a compressed representation of the aligned image data 160. From the compressed image data 170, i.e. the compressed representation of the aligned image data 160, the decoder attempts to reconstruct the aligned image data 160.

The autoencoder may be a low-capacity autoencoder, that is to say that the compressed image data 170, i.e. the compressed representation of the aligned image data 160, is limited in the number of relationships between pixels in the aligned image data 160 which it can model. In contrast, a high-capacity autoencoder is able to model more relationships between more pixels in the aligned image data 160 than a low-capacity autoencoder.

The low-capacity type of autoencoder is enforced by applying a low-rank penalty to the output of the encoder module 725. The low-rank penalty may be approximated by a monotonically increasing functional penalty. For example, where the output of the encoder module 725 is $z \in \mathbb{R}_+^N$, and $w \in \mathbb{R}_+^N$ is a positional weighting, then the functional penalty P may be:

$$P = w^T z$$

where each component of w, $$w_i = \frac{i^n}{\sum_{i=1}^{N} i^n}$$

with $i \in \{1, \ldots, N\}$, and $n \in \mathbb{N}$.

This functional penalty explicitly encourages the autoencoder to represent the aligned image data 160 using primarily the top components of z, $z_i$, $i \in \{1, \ldots, K\}$ and K<<N, resulting in a smaller data size for the reconstructed image data 180.

An advantage of using an autoencoder for compression and reconstruction of the aligned image data 160 is autoencoders are robust to occlusion which is typically seen in images captured by user electronic device 201, 202, such as a finger holding official document 100. Similarly, autoencoders are robust to partial crop of the image of official document 100, for example where the captured image does not contain the whole of the official document 100, but rather a corner or edge of the official document is cropped. Previously proposed approaches for aligning images typically fail when the image contains either occlusion or partial crop.

Outputting Aligned Images and Optimisation

With reference to step 580 of FIG. 5, the fifth step of the disclosed method is to output a set of aligned images 190 (not shown) from the reconstructed image data 180.

The set of aligned images 190 contains only images of official document 100 which, due to the alignment caused by the disclosed method, are in a suitable form for automated official document authentication. Accordingly, the set of aligned images 190 may be output and stored to server memory 444 or elsewhere for automated official document authentication. Particular aspects of automated official document authentication which benefit from a set of aligned images which are aligned using the disclosed method are discussed in detail below.

However, the set of aligned images 190 may not be output immediately after completion of the fourth step 560. Instead, the first deep neural network 600 and the second deep neural network 700 may be trained based on the aligned image data 160 and/or the reconstructed image data 180. Then, image data 150 may be passed through the first deep neural network 600 (i.e. the third step 520) and the second deep neural network 700 (i.e. the fourth step 540 and fifth step 560) again. After this, the reconstructed image data 160 from the repeated fifth step 560 may be used in place of the reconstructed image data 160 of the previous fifth step 560 to output a set of aligned images 190.

An advantage of repeating, or iterating, the passing of image data 150 through the first deep neural network 600 (i.e. the third step 520) and the second deep neural network 700 (i.e. the fourth step 540 and fifth step 560), is that the alignment of the image achieved by the first deep neural network 600 in combination with the second deep neural network 700 is improved, as is further discussed below. To this end, step 520, step 540, and step 560 may be iterated any number of times to optimise the alignment of the set of aligned images. For example, the step 520, step 540, and step 560 may be iterated only once, or up to thousands of times, depending on the alignment quality desired. Typically only a few iterations are required to produce satisfactory alignment quality for automated official document authentication.

Figure 8:
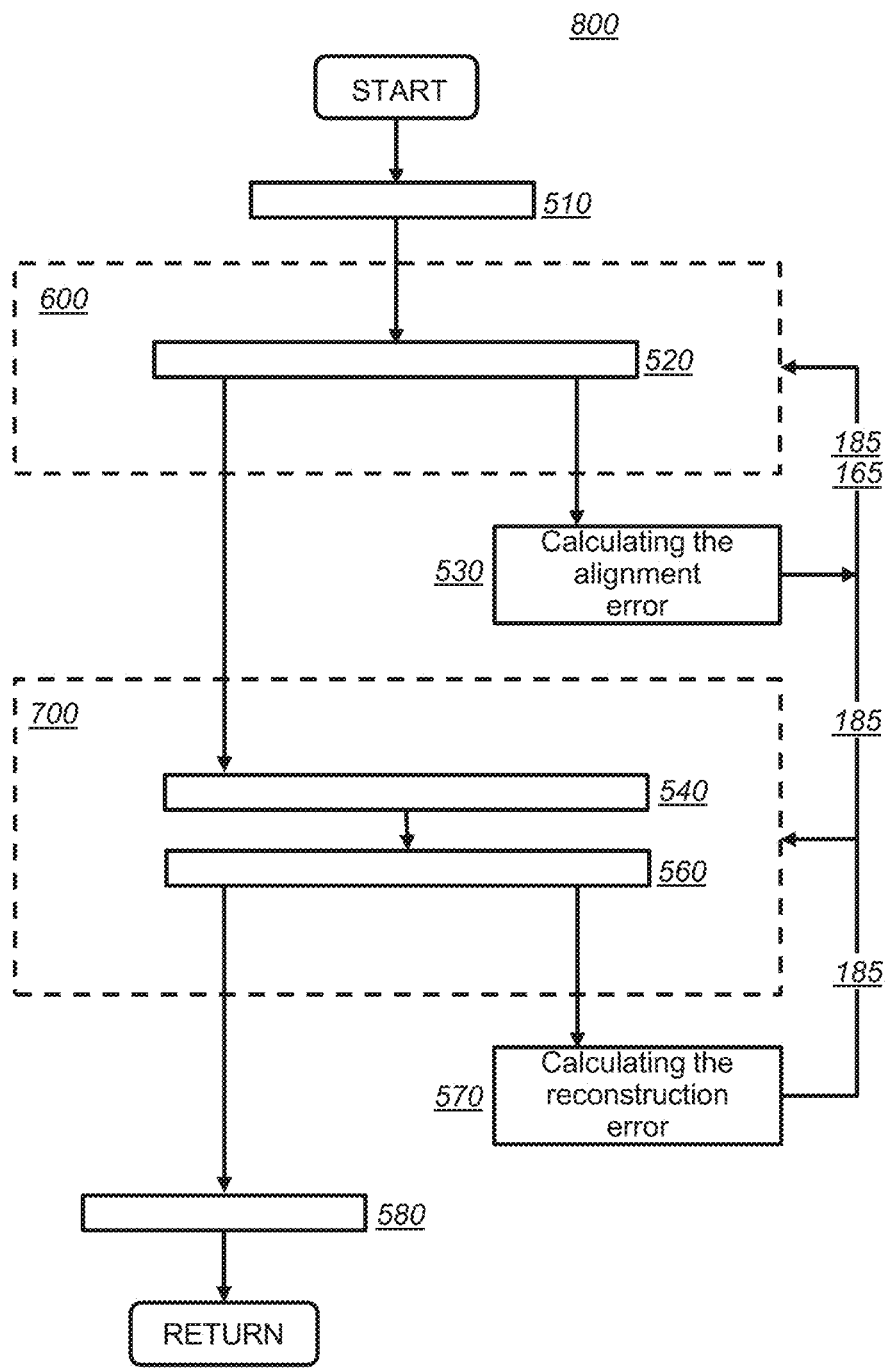
FIG. 8 presents a flow diagram including error propagation according to the present invention.

With reference to FIG. 8, improved alignment may be achieved in the iterations by calculating an alignment error 165 (step 530), which is the error between the template image 140 and the aligned image data 160, and propagating the alignment error 165 to the first deep neural network 600. Alternatively or additionally, a reconstruction error 185 may be calculated (step 570) which is the error between the aligned image data 160 and the reconstructed image data 180. The reconstruction error 185 may then be propagated to the second deep neural network 700 and/or the first deep neural network 600. These steps and errors are described in more detail below. The remaining steps of FIG. 8 are the same as those shown in and discussed in relation to FIG. 5.

An advantage of improving the image alignment using the disclosed method is that the training of first deep neural network 600 and second deep neural network 700 is unsupervised. This means that only one image of an official document 100 is required, i.e. the template image 140, in order to jointly align a large set of images of an official document 100. In practice, the disclosed method for aligning a set of images with unsupervised training is significantly faster than known methods (i.e. within a few hours).

The first deep neural network 600 and second deep neural network 700 are trained for a specific type of official document 100. Thus, a different first deep neural network 600 and neural network 700 are required to be trained each type of official document 100. For instance, one first deep neural network 600 and second deep neural network 700 may be trained for aligning images of UK driving licenses, and another deep neural network 600 and second deep neural network 700 may be trained for aligning images of a Finnish passports. As unsupervised training of first deep neural network 600 and second deep neural network 700 is fast, and the first deep neural network 600 and the second deep neural network 700 have a minimal memory footprint, the disclosed method when aligning a set of images of a new type of official document 100 may be quickly deployed.

Alignment Error

As mentioned above, each image of the image data 150 is substantially aligned with template image 140 by a degree of alignment between "full alignment" and "prima facie" alignment. This degree of alignment (or, more accurately, misalignment) is characterized by the alignment error 165. The alignment error 165 thus provides a measure of how accurately first deep neural network 600 has aligned the set of images in the aligned image data 160. For instance, a higher alignment error 165 implies a higher amount of misalignment for the set of images of the aligned image data 160. The alignment error is calculated using the aligned image One method for calculating the alignment error 165 is to normalize the aligned image data 160, such that the aligned image data 160 has zero mean and unit standard deviation. Once the aligned image data 160 is normalized, the alignment error 165 may be calculated by using the L1-norm with the normalized aligned image data 160 and the template image 140. The L1-norm minimizes the sum of the absolute differences between the template image 140 and the normalized aligned image data 160. The L1-norm is also known as least absolute deviations, and least absolute errors. The L1-norm is advantageous because its use always provides one solution which is stable. Alternative differentiable methods for calculating the alignment error 165 are also possible.

For the alignment error 165, the L1-norm may be calculated using each of the pixels of the normalized aligned image data 160 and each of the pixels of the template image 140. This means that the alignment error 165 may be based on all pixels locations (dense) rather than using a few key points (sparse). It is noted that the calculated alignment error 165 is estimated based on computer vision measure of image alignment (e.g. normalized cross-correlation), rather than physical ones (e.g. mm), as the latter depends on the image resolution.

Once calculated, the alignment error 165 may be used to train the first deep neural network 600. In particular, the alignment error 165 may be back-propagated to the first deep neural network 600, and used to update the weight parameters of the first deep neural network 600.

By training the first deep neural network 600 using the alignment error 165, the first deep neural network 600 achieves improved (i.e. more accurate) image alignment during an iteration of the step of applying the at least one image transform to the image data 150 to form aligned image data 160 (step 520). Subsequently, the first deep neural network 600 may be further trained, in the same manner as set out above, using the alignment error 165 from the iterated step. This may be repeated any number of times to achieve a desired image alignment quality.

Reconstruction Error

The reconstruction error 185 is the difference between the aligned image data 160 which is input into second deep neural network 700 and the reconstructed image data 180 which is output from second deep neural network 700.

The reconstruction error 185 may be calculated using the L1-norm. Similar to the alignment error 165, the reconstruction error 185 may be calculated using each of the pixels of the reconstructed image data 180 and each of the pixels of the aligned image data 160. The L1-norm is advantageous because its use always provides one solution which is stable Alternatively, the reconstruction error 185 may be calculated using the L2-norm. The L2-norm is also known as least squares. The L2-norm minimizes the sum of the square of the differences between the aligned image data and the reconstructed image data. Similar to L1-norm, the reconstruction error 185 may be calculated using the L2-norm for each of the pixels of the reconstructed image data 180 and each of the pixels of the aligned image data 160.

The reconstruction error 185 provides a measure of how accurate the alignment of the first deep neural network 600 is between each image in the set of images in the aligned image data 160. Thus, for example, a higher reconstruction error 185 implies a higher amount of misalignment between the set of images of the aligned image data 160. This is because, as mentioned above, a set of images sharing similar appearance and structure characteristics which are accurately aligned requires less modelling capacity to be reconstructed well than a set of images which are not accurately aligned. As a consequence, the second deep neural network 700, which has limited modelling capacity, cannot accurately reconstruct a set of images which are not accurately aligned. In contrast, a set of images which are accurately aligned is reconstructed by the second deep neural network 700 with a low reconstruction error 185. Thus, similar to the alignment error 165, the reconstruction error 185 provides a measure of the alignment achieved by the first deep neural network 600.

Accordingly, the reconstruction error 185 may be used to train the first deep neural network 600. Alternatively or additionally, the reconstruction error 185 may be used to train the second deep neural network 700.

Training the first deep neural network 600 using the calculated reconstruction error 185 may be performed by back-propagating the calculated reconstruction error 185 to the first deep neural network 600. The weight parameters of the first deep neural network 600 may then be updated using the calculated reconstruction error 185.

Training the second deep neural network 700 using the calculated reconstruction error 185 may be performed by back-propagating the calculated reconstruction error 185 to the second deep neural network 700.

By training the first deep neural network 600 and the second deep neural network 700 using the reconstruction error 185, the first deep neural network 600 and second deep neural network 700 achieves improved (i.e. more accurate) image alignment during an iteration of the step of applying the at least one image transform to the image data 150 to form aligned image data 160 (step 520). Subsequently, the first deep neural network 600 and the second deep neural network 700 may be further trained, in the same manner as set out above, using the alignment error 185 from the iterated step. This may be repeated any number of times to achieve a desired image alignment quality.

Authentication using Aligned Images

Figure 9:
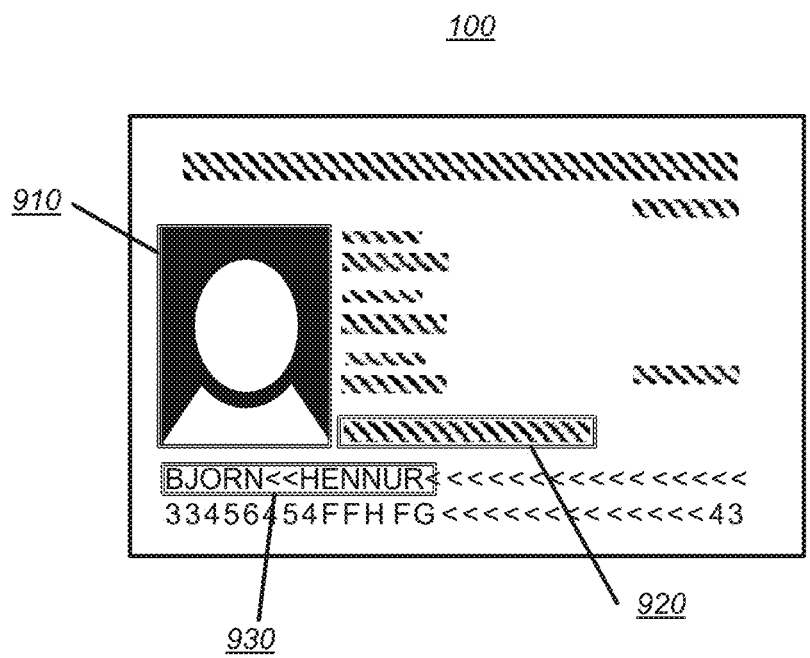
FIG. 9 presents a block image of an exemplary official document with annotations.

Outputting a set of aligned images 190 is useful for various automated official document authentication processes, including annotation. With reference to FIG. 9, annotation of an image of an official document 100 refers to the marking of salient portions of the official document 100, including image fields 910, text fields 920 and/or machine readable zones 920. These portions include information which is extractable by optical character recognition, image processing, and the like, and may be used to determine if the official document 100 is authentic. For example, a name may be extracted from text field 920 and compared against a name existing in a server memory 444, or input into user electronic device 201, 202. If the names appear to be the same, then the official document 100 may be authentic.

Accordingly, the disclosure provides a computer-implemented method for annotating the set of aligned images 190. The method may be performed by server processor 440. The method comprises the steps of: annotating a portion of the template image 140, the annotated portion having first coordinates; acquiring the aligned set of images 190; obtaining a corresponding portion in each of the set of images using the first coordinates.

With reference to FIG. 9, the portion in the template image 140 which is annotated may comprise one or more of: a text field 920, an image field 910, and a machine readable zone 930. A text field 920 may contain, for example, a name, date of birth, nationality of a person. An image field 910 may contain, for example, a facial image or another biometric image of a person. The machine readable zone 930 may contain, for example, a barcode or a QR code relevant to a person. The annotations may be determined manually and input into server processor 440, or may be determined by the server processor 440, and checked manually.

The first coordinates of the portion are relative to an edge or a corner of the official document image 100 in the template image 140. This edge or corner may also be annotated. In addition to the portion with first coordinates, a second portion with second coordinates may be annotated, similarly a third portion with third coordinates may be annotated. In fact, there may be up to an nth portion with nth coordinates, subject to the number n of portions chosen for automated document authentication. The coordinates may be stored in server memory 444.

The set of aligned images 190 may be acquired from server memory 444, where the set of aligned images 190 is stored after the disclosed method of aligning.

Once the template image 140 is annotated, and the set of aligned images 190 acquired, corresponding portions can be obtained from the set of aligned images 190 using the coordinates of the portions. This is not possible using known method for aligning a set of images as the inferior quality of alignment with these known methods means that the coordinates would not accurate for all images of an official document 100 in the set of images. Accordingly, when using known methods for aligning a set of images, it is generally required that each image of an official document 100 be passed through a data extraction pipeline to be individually annotated. One such data extraction pipeline is described in European patent application no. 18151286.4.

An advantage of this approach to annotation is that, for a new type of official document 100, only one image of that type of official document 100 (i.e. the template image 140) is required for alignment and annotation. Further, only the template image 140 needs to be annotated, then corresponding annotations in a large set of images of the official document 100 may be extracted in a fully unsupervised manner.

Further automated official document processes not mentioned here may also benefit from the disclosed method for aligning a set of images.

The following list provides aspects of the disclosure and forms part of the description. These aspects can be combined in any compatible combination beyond those expressly stated. The aspects can also be combined with any compatible features described herein:

Aspect 1. A computer-implemented method for aligning a set of images, the method comprising:
 a. acquiring image data comprising a set of images;
 b. applying, using a first deep neural network, at least one image transform to the image data to form aligned image data in which each image of the set of images is substantially aligned with a template image;
 c. compressing the aligned image data;
 d. reconstructing the image data from the compressed image data; and
 e. outputting a set of aligned images from the reconstructed image data.

Aspect 2. The computer-implemented method of Aspect 1, wherein each image of the set of images is substantially aligned with a template image in that there is an alignment error.

Aspect 3. The computer-implemented method of Aspect 2, further comprising:
 calculating the alignment error using the aligned image data and the template image; and
 training the first deep neural network using the calculated alignment error.

Aspect 4. The computer-implemented method of any preceding Aspect, further comprising:
 calculating a reconstruction error using the aligned image data and the reconstructed image data.

Aspect 5. The computer-implemented method of Aspect 4, further comprising:
 training the first deep neural network using the calculated reconstruction error.

Aspect 6. The computer-implemented method of any preceding Aspect, wherein the aligned image data is compressed and reconstructed using a second deep neural network.

Aspect 7. The computer-implemented method of Aspect 6, when dependent on Aspect 4, further comprising:
 training the second deep neural network using the calculated reconstruction error.

Aspect 8. The computer-implemented method of any preceding Aspect, further comprising, prior to outputting the set of aligned images:

iterating steps b-d for the set of images to improve the alignment of the set of images.

Aspect 9. The computer-implemented method of Aspect 8, wherein outputting the set of aligned images from the reconstructed image data comprises using the reconstructed image data of the iterated steps.

Aspect 10. The computer-implemented method of any preceding Aspect, wherein the set of images have shared structural characteristics.

Aspect 11. The computer-implemented method of any preceding Aspect, wherein each image of the set of images comprises an image of an official document.

Aspect 12. The computer-implemented method of Aspect 11, wherein the official document is the same type of official document for each image of the set of images.

Aspect 13. The computer-implemented method of any preceding Aspect, wherein the template image comprises an image of an official document.

Aspect 14. The computer-implemented method of Aspect 13, when dependent on 11, wherein the official document of the template image is the same type of official document as each image of the set of images.

Aspect 15. The computer-implemented method of any preceding Aspect, wherein the set of images comprises between 2 and 2000 images.

Aspect 16. The computer-implemented method of any preceding Aspect, wherein the set of images comprises images having a resolution of up to 256×256 pixels.

Aspect 17. The computer-implemented method of any preceding Aspect, wherein the at least one image transform is a linear transformation.

Aspect 18. The computer-implemented method of any preceding Aspect, wherein the at least one image transform comprises one or more of: rotation, translation, scaling, and shearing.

Aspect 19. The computer-implemented method of any preceding Aspect, wherein the first deep neural network is based on a densely fused spatial transformer network.

Aspect 20. The computer-implemented of any of Aspects 3-19, wherein the aligned image data is normalised to have zero mean and unit standard deviation.

Aspect 21. The computer-implemented of Aspect 20, wherein the alignment error is calculated using the L1-norm using the normalised aligned image data.

Aspect 22. The computer-implemented of Aspect 21, wherein the alignment error is calculated using each of the pixels of the normalised aligned image data and each of the pixels of the template image.

Aspect 23. The computer-implemented method of any of Aspects 3-22, wherein training the first deep neural network using the calculated alignment error comprises back-propagating the calculated alignment error to the first deep neural network.

Aspect 24. The computer-implemented method of Aspect 23, wherein training the first deep neural network using the calculated alignment error further comprises updating the weight parameters of the first deep neural network using the calculated alignment error.

Aspect 25. The computer-implemented method of any of Aspects 4-24, wherein the reconstruction error is calculated using the L1-norm.

Aspect 26. The computer-implemented method of any of Aspects 4-24, wherein the reconstruction error is calculated using the L2-norm.

Aspect 27. The computer-implemented method of any of Aspects 5-26, when dependent on Aspect 4, wherein training the first deep neural network using the calculated reconstruction error comprises back-propagating the calculated reconstruction error to the first deep neural network.

Aspect 28. The computer-implemented method of Aspect 27, wherein training the first deep neural network using the calculated reconstruction error further comprises updating the weight parameters of the first deep neural network using the calculated reconstruction error.

Aspect 29. The computer-implemented method of any of Aspects 7-28, wherein training the second deep neural network using the calculated reconstruction error comprises back-propagating the calculated reconstruction error to the second deep neural network.

Aspect 30. The computer-implemented method of any preceding Aspect, wherein the reconstructed image data has a reduced data size compared to the aligned image data.

Aspect 31. The computer-implemented method of any preceding Aspect, wherein the second deep neural network is an autoencoder.

Aspect 32. The computer-implemented method of Aspect 31, wherein the autoencoder comprises an encoder module and a decoder module, and wherein the aligned image data is compressed using the encoder module and the image data is reconstructed using the decoder module.

Aspect 33. The computer-implemented method of Aspect 32, wherein a low-rank penalty is applied to the output of the encoder module.

Aspect 34. The computer-implemented method of Aspect 33, wherein the low-rank penalty is approximated by a monotonically increasing functional penalty.

Aspect 35. The computer-implemented method of any of Aspects 32-34, wherein the encoder module and the decoder module are fully-connected.

Aspect 36. The computer-implemented method of any of Aspects 31-35, wherein the aligned image data is compressed into a latent-space representation.

Aspect 37. The computer-implemented method of Aspect 36, wherein the image data is reconstructed from the latent-space representation.

Aspect 38. A computer-implemented method for annotating a set of aligned images aligned obtained by the method of any of Aspects 1-37, the method comprising:

annotating a portion of the template image, the annotated portion having first coordinates;

acquiring the aligned set of images;

obtaining a corresponding portion in each of the set of images using the first coordinates.

Aspect 39. The computer-implemented method of Aspect 38, wherein the portion comprises one or more of: a text field, an image field, a machine readable zone.

Aspect 40. A computer-readable medium comprising executable instructions for performing the computer-implemented method of any preceding Aspect.

Aspect 41. A computer comprising a processor configured to execute executable code stored in memory, wherein the executable code comprises instructions for performing the method of any of Aspects 1-40.

The present invention has been described above by way of example only, and modifications of detail may be made which fall within the scope of the invention which is defined by the appended claims.

What is claimed is:

1. A computer-implemented method for aligning a set of images, the method comprising:
   a. acquiring image data comprising a set of images;
   b. applying, using a first deep neural network, at least one image transform to the image data to form aligned image data in which each image of the set of images is substantially aligned with a template image;
   c. compressing the aligned image data;
   d. reconstructing the image data from the compressed image data; and
   e. outputting a set of aligned images from the reconstructed image data.

2. The computer-implemented method of claim 1 wherein each image of the set of images is substantially aligned with a template image in that there is an alignment error.

3. The computer-implemented method of claim 2 further comprising:
   calculating the alignment error using the aligned image data and the template image; and
   training the first deep neural network using the calculated alignment error.

4. The computer-implemented method of claim 3 wherein the aligned image data is normalized to have zero mean and unit standard deviation, and the alignment error is calculated using the L1-norm using each of the pixels of the normalized aligned image data and each of the pixels of the template image.

5. The computer-implemented method of claim 1 further comprising:
   calculating a reconstruction error using the aligned image data and the reconstructed image data.

6. The computer-implemented method of claim 5 further comprising:
   training the first deep neural network using the calculated reconstruction error.

7. The computer-implemented method of claim 1 wherein the aligned image data is compressed and reconstructed using a second deep neural network.

8. The computer-implemented method of claim 7 further comprising:
   calculating a reconstruction error using the aligned image data and the reconstructed image data; and
   training the second deep neural network using the calculated reconstruction error.

9. The computer-implemented method of claim 1 further comprising, prior to outputting the set of aligned images:
   iterating steps b-d for the set of images to improve the alignment of the set of images.

10. The computer-implemented method of claim 8 wherein outputting the set of aligned images from the reconstructed image data comprises using the reconstructed image data of the iterated steps.

11. The computer-implemented method of claim 1 wherein the set of images have shared structural characteristics.

12. The computer-implemented method of claim 11 wherein each image of the set of images comprises an image of an official document, and wherein the template image comprises an image of an official document.

13. The computer-implemented method of claim 12 wherein the official document of the template image is the same type of official document as each image of the set of images.

14. The computer-implemented method of claim 1 wherein the first deep neural network is based on a densely fused spatial transformer network.

15. The computer-implemented method of claim 7 wherein the second deep neural network is an autoencoder.

16. The computer-implemented method of claim 15 wherein the autoencoder comprises an encoder module and a decoder module, and
   wherein the aligned image data is compressed using the encoder module and the image data is reconstructed using the decoder module.

17. The computer-implemented method of claim 16 wherein a low-rank penalty is applied to the output of the encoder module.

18. A computer-implemented method for annotating a set of aligned images obtained by the method of claim 1, the method comprising:
   annotating a portion of the template image, the annotated portion having first coordinates;
   acquiring the aligned set of images; and
   obtaining a corresponding portion in each of the set of images using the first coordinates.

19. A non-transitory computer-readable medium comprising executable instructions for performing the computer-implemented method of claim 1.

20. A computer comprising a processor configured to execute executable code stored in memory, wherein the executable code comprises instructions for performing the method of claim 1.

* * * * *